United States Patent [19]
Check, Jr. et al.

[11] 4,376,981
[45] Mar. 15, 1983

[54] ELECTRONIC POSTAGE METERING SYSTEM

[75] Inventors: Frank T. Check, Jr., Orange; Alton B. Eckert, Jr., Norwalk; Joseph R. Warren, Stamford, all of Conn.

[73] Assignee: Pitney Bowes Inc., Stamford, Conn.

[21] Appl. No.: 54,955

[22] Filed: Jul. 3, 1979

Related U.S. Application Data

[60] Division of Ser. No. 918,784, Jun. 26, 1978, Pat. No. 4,180,856, which is a continuation of Ser. No. 820,058, Jul. 29, 1977, abandoned, which is a continuation-in-part of Ser. No. 715,914, Aug. 19, 1976, abandoned.

[51] Int. Cl.³ .............................................. G06F 15/20
[52] U.S. Cl. ................................... 364/570; 364/466; 177/25
[58] Field of Search .................. 364/466, 570, 567; 177/5, 25

[56] References Cited
U.S. PATENT DOCUMENTS

| | | | |
|---|---|---|---|
| 3,635,297 | 1/1972 | Salava | 177/5 |
| 3,692,988 | 9/1972 | Dlugos et al. | 364/466 |
| 3,951,221 | 4/1976 | Rock | 177/25 X |
| 4,024,380 | 5/1977 | Gunn | 235/432 |
| 4,047,006 | 9/1977 | Ellner | 364/466 |
| 4,139,892 | 2/1979 | Gudea et al. | 177/25 X |
| 4,180,856 | 12/1979 | Check, Jr. et al. | 364/466 |

*Primary Examiner*—Edward J. Wise
*Attorney, Agent, or Firm*—David E. Pitchenik; W. D. Soltow, Jr.; A. W. Scribner

[57] ABSTRACT

A system for automatically setting a postage meter as a function of package weight and destination includes a scale mechanism for generating weight-representing signals. The package postage can be established by converting the destination zip code to a destination zone. The destination zone used in retrieving a minimum postage and incremental postage amounts is applicable for that zone from data storage. The weight-representing signal is successively decremented and the postage amounts synchronously incremented until a signal checking circuit establishes that the decremented weight-representing signal is equal to zero.

6 Claims, 15 Drawing Figures

CHART FOR
POSTAGE METER PROGRAM

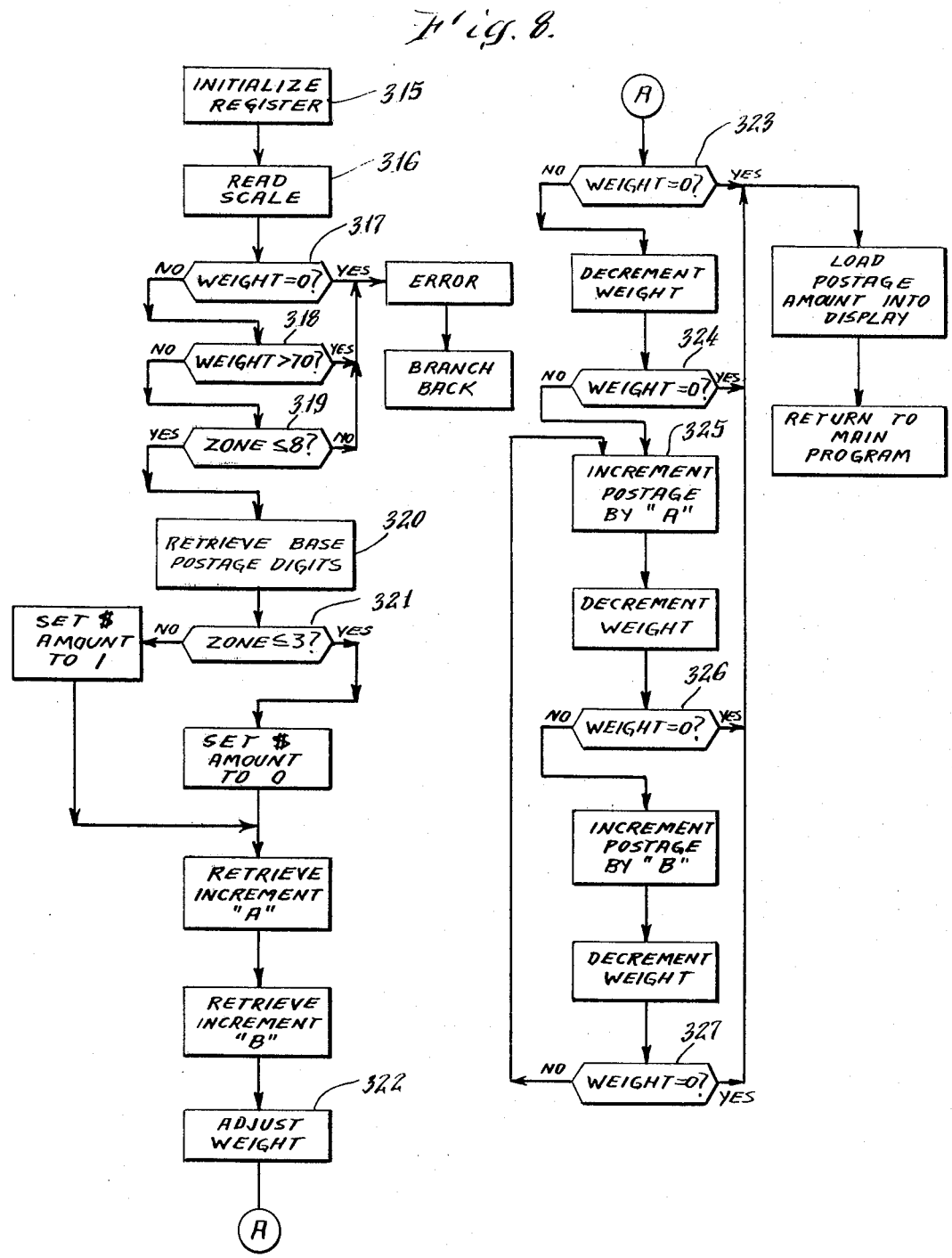

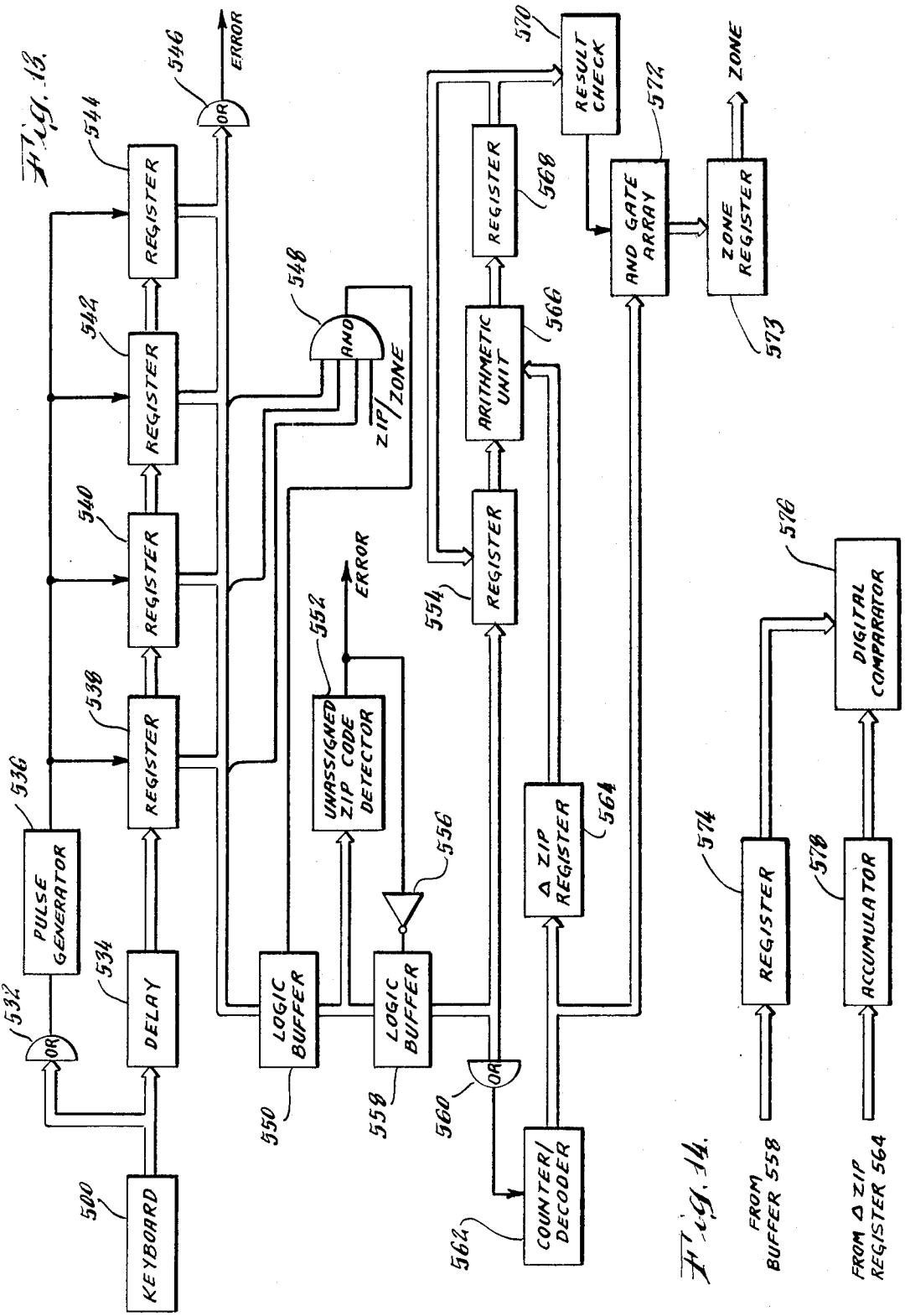

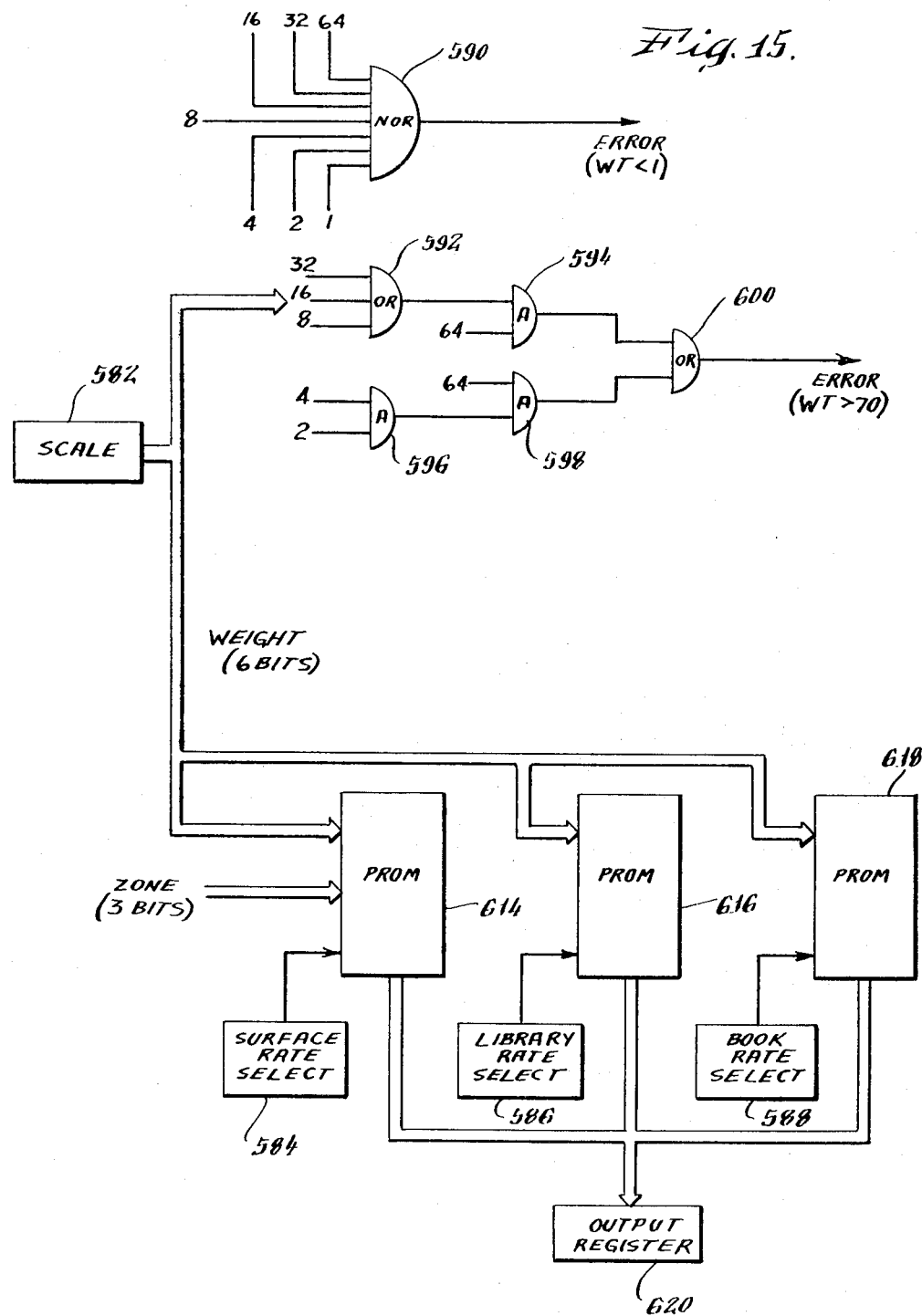

ELECTRONIC POSTAGE METERING SYSTEM

CROSS REFERENCE TO RELATED APPLICATION

This is a division, of application Ser. No. 918,784, filed June 26, 1978, now U.S. Pat. No. 4,180,856, which was a continuation of application Ser. No. 820,058 filed July 29, 1977, which in turn was a continuation-in-part of application Ser. No. 715,914 filed Aug. 19, 1976 both now abandoned.

BACKGROUND OF THE INVENTION

The present invention relates to postage meters and more particularly to an electronic postage metering system including zip code-to-zone conversion.

The type of postal scale which is in widespread commercial use at present is a mechanical or electro-mechanical device for deriving postage as a function of package weight and destination zone.

While the Postal Service still uses zones for purposes of calculating postage on packages mailed from one part of the country to another, most people are not aware of which zone a particular destination falls in. They are, however, generally aware of the zip code at the destination. To permit a user to make a conversion from destination zip code to destination zone, the Postal Service publishes charts showing destination zones relative to a specific city of origin as a function of the first three digits or prefix of destination zip codes. The Postal Service also publishes another chart tabulating postage as a function of different weight-zone combinations. A user consults one chart to determine the proper zone and then, after weighing the package to be mailed, consults the other chart to find the proper postage. The user employs the retrieved postage entry to manually set a conventional postage meter to imprint the postage on a tape which can be affixed to the package.

U.S. Pat. No. 3,636,297, Salava, discloses a computer-type postage calculation in which the prefix of a destination zip code is converted to zone information through the use of a look-up table in which zones are stored as a function of zip code prefixes. The table is scanned in numerically ascending order until a correspondence is found between a user-entered destination zip code prefix and one of the addresses in the table. Signals representing the parcel weight, destination zone and class of handling are apparently algebraically added. The results would not appear to be consistently accurate. The calculator apparently would establish the same postage for a two-pound package being sent to zone 4 at parcel post rates as it would for a four-pound package being sent to zone 2 at the same rates. However, the Postal Service has established different postages for these two conditions. Moreover, the required memory or data storage capacity for such a system would be large and costly.

SUMMARY OF THE INVENTION

The present invention is an improved postage metering system for automating the task of computing postage for packages being sent by any class of mail selected from available classes.

The function of the system is to set a postage-printer in a postage meter. This system includes input means for generating weight-representing signals and input means for providing signals representing the destination zip code for the package. The system also includes means for determining the destination zone as a function of a destruction zip code and means for computing the proper postage as a function of both the weight-representing signal and a destination zone signal. Finally, the system includes a meter setting means for translating the postage-representing signals to settings for the postage printer.

The postage computing means includes means for selecting a sequence consisting of a minimum postage amount and incremental postage amounts. The weight-representing signal is then successively decremented while a postage-representing signal is synchronously incremented by the minimum and incremental postage amounts. The decrementing/incrementing operations cease when the decremented weight-representing signal is found to be less than or equal to a predetermined number. The incremented postage-representing signal is applied to the postage printer.

DESCRIPTION OF THE DRAWINGS

While the specification concludes with claims particularly pointing out and distinctly claiming that which is regarded as the present invention, further details of particular embodiments of the invention may be more readily ascertained from the following detailed description when read in conjunction with the accompanying drawings wherein:

FIG. 8 is a flow chart of a routine for calculating surface parcel post postage;

FIG. 13 is a block diagram for the zip-to-zone conversion circuits of the system of FIG. 10;

FIG. 14 illustrates a modification to the converter of FIG. 13 for providing an alternate mode of operation; and FIG. 15 is a schematic diagram of the postage calculating circuit for the system shown in FIG. 11.

DETAILED DESCRIPTION

Figure 1:
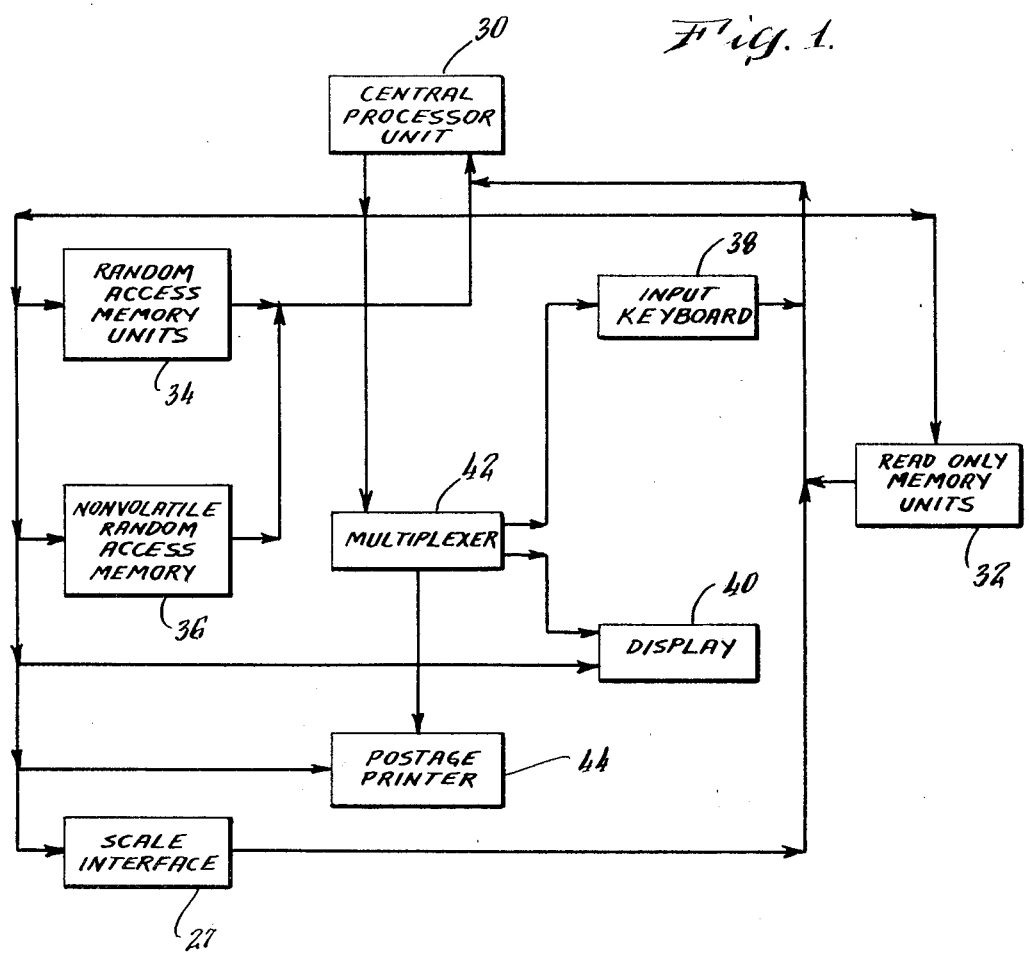
FIG. 1 is a functional block diagram of the computerized postage meter system into which the present invention could be incorporated.

Referring to FIG. 1, the general functional arrangement of a computerized postage meter incorporating the present invention is shown. The system includes a central processor unit (CPU) 30 which operates on input data and controls the flow of data between various memory units. One type of memory unit employed with the central processor unit 30 is a permanent, read only memory 32 which stores the specific sequence of operations to be performed in calculating postage and the sequence of operations for other routines employed within the system. A second type of memory unit employed is a read/write random access memory 34 which is used to hold and forward working data needed by and generated within the central processor unit 30.

An additional memory component coupled to the central processor unit 30 is a non-volatile random access memory 36 which operates on and stores certain critical information employed in the postal system. The critical information includes working data representing crucial accounting functions such as the contents of descending register and an ascending register. In one embodiment, the non-volatile memory 36 may be a CMOS random access memory with a battery back-up unit for holding the stored data in the event of a loss of power to the system.

Data and commands can be imputted to the CPU 30 through an input keyboard 38. Data can include directly entered postage values, destination zone values and destination zip code prefixes. Commands include a display command which transfers the contents of memory 34 or memory 36 through CPU 30 to an output display device 40. Input/output signals may be multiplexed by a multiplexer 42 interposed between the central processor 30 and input/output components 38 and 40. Central processor unit 30 is also linked to scale interface circuits 27 which provide binary weight-representing signals to the system.

When appropriate postal data and commands have been entered into the CPU 30 through keyboard 38 and weight-representing signals have been received from scale interface circuits 27, CPU 30, under control of programs stored in read-only memory 32, generates postage-representing signals which are applied to a postage printer 44 in a postage meter. When the meter has been set to the appropriate values, a print command generated by a user-controlled input to CPU 30 causes postage to be imprinted directly on an envelope or on a tape to be affixed to an envelope or package.

One example of a system into which the present invention may be incorporated can be found in co-pending U.S. application Ser. No. 536,248 filed Dec. 23, 1974, for a Micro Computerized Electronic Postage Meter System, which application is assigned to the assignee of the present invention.

Figure 2:
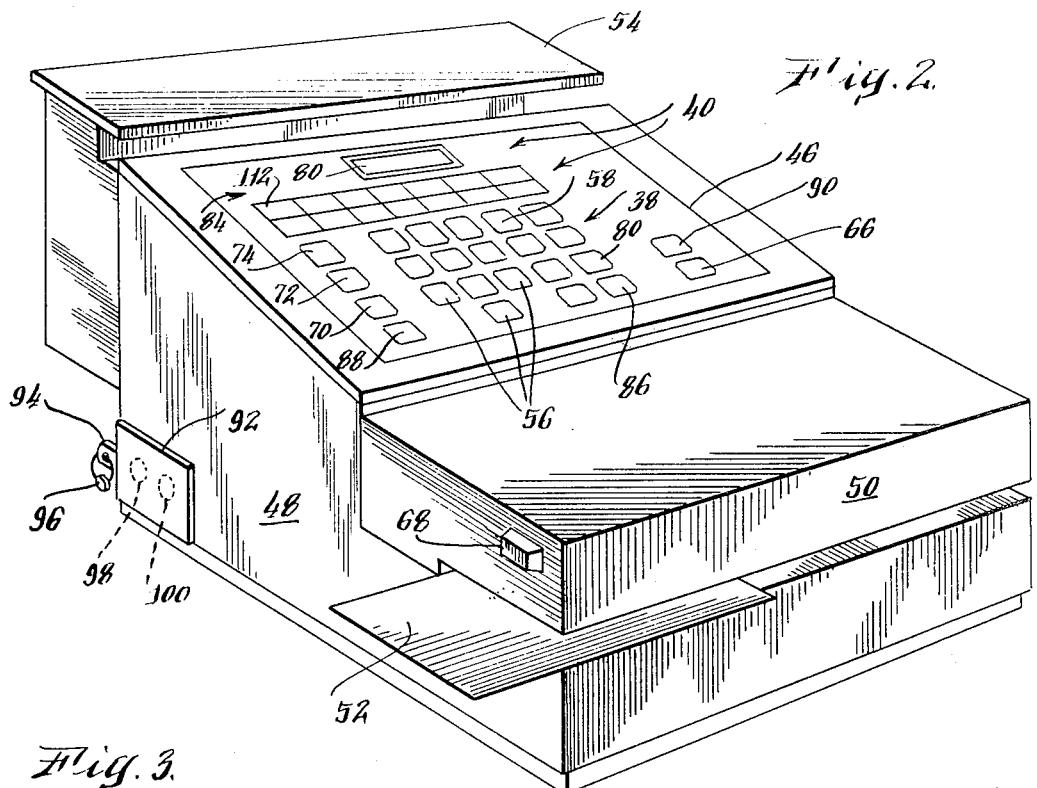
FIG. 2 is a perspective view of a housing for the meter, including a scale mechanism.

FIG. 2 shows one type of housing for a system incorporating the invention. The input keyboard 38 and output display 40 are mounted in panel 46 on the top surface of a housing 48. The postage printer may be contained in a forward section 50 wherein the postage may be imprinted either on envelopes, such as envelope 52 or on tapes (not shown) to be affixed to packages. As the present invention pertains to calculation of postage for packages, the description of the operation of the meter is limited to calculation of package postage. The meter includes a scale mechanism 54 on which a package to be mailed can be deposited.

Scale 54 includes a suitable transducer mechanism for converting displacement of the scale tray to an encoded binary signal which is supplied to the scale interface circuits 27 within housing 48. The signals may or may not be contemporaneously displayed on output display 40.

The destination zone of a package, if known, may be entered directly into the system through the 0-9 numerical pushbuttons 56. If the destination zone is not known, the prefix (first three digits) of the destination zip code is entered into the system through the pushbuttons 56. A ZIP-ZONE key 58 initiates conversion of the destination zip code prefix to a destination zone value.

The class of handling of the package (surface rates, book rates or library rates) is selected by means of pushbuttons 60, 62, 64, respectively. Once the destination zone, package weight and class of handling are introduced into the system, the proper amount of postage is automatically calculated and displayed on output display 40. A Set button 66 must be depressed before the postage printer is set. Once the meter has been set, an imprint button 68 is depressed to start the actual print operation.

While the illustrated embodiment of the invention permits calculation of postage for the three specified classes of mail, the invention could easily be extended to performing calculations for other classes such as priority mail or UPS service.

Figure 3:
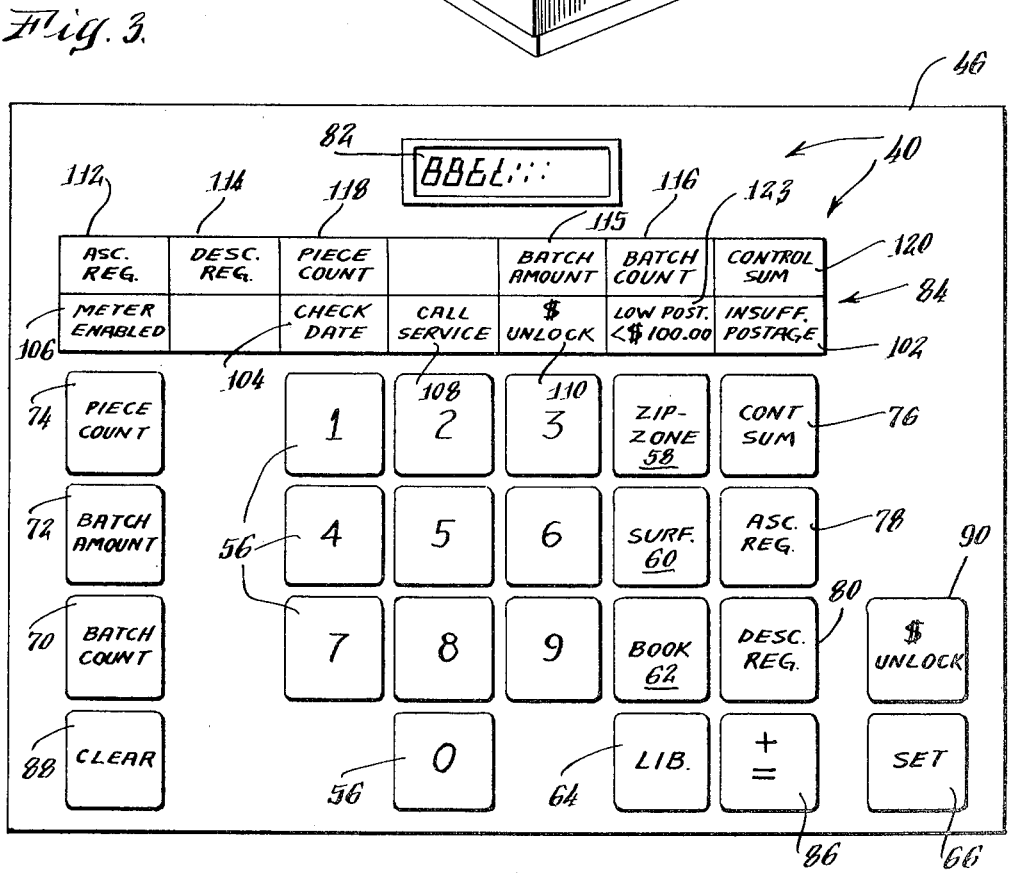
FIG. 3 is an enlarged plan view of the keyboard display for the meter shown in FIG. 2.

FIG. 3 is an enlarged view of panel 46 showing the display 40 and the keyboard 38 in more detail. The keyboard 38 includes the numerical pushbuttons 56 used for entering the amount of postage required (if known), a destination zone or a destination zip code prefix into the system. Pushbuttons 70, 72, 74, 76, 78 and 80 control the display of register contents for batch count, batch amount, piece count, control sum, ascending register and decending register, respectively. When one of these buttons is depressed, a numerical section 82 of display 40 is cleared. The contents of the appropriate register are loaded into and appear at numerical display 82 while the appropriate indicator lamp in a back-lighted legend display area 84 is energized.

The function of the various registers are described briefly below. Batch count and batch amount registers contain a running account of the total number of pieces of mail processed during a single run and of the total postage expended for this mail. These registers can be reset to zero by the user, permitting each of several departments in a large organization to easily keep records of their postal activities. A piece count register indicates the total number of postage printings (pieces of mail) the machine has performed. The piece count register differs from the batch count register in that the former is not resettable by the user. The piece count information is used to determine when the system may require servicing and maintenance and for accounting purposes. The ascending and descending registers serve standard functions. The ascending register gives a running total of all postage printed during the life of the meter and the descending register informs the user of the amount of postage funds still remaining in the postage system. The control sum register provides a security check for the descending and ascending registers. The control sum, which must always correspond with the summed readings of the ascending and descending registers, is the total amount of postage ever put into the machine.

A $\pm$ key 86 allows the user to add special charges to the calculated postage such as special delivery or certificate charges and the like. A Clear key 88 clears the numerical display 82. If the contents of one of the batch registers is displayed when the Clear key is actuated, that register is set to zero.

The Set button 66 is depressed after the required postage has been calculated and any special charges added through numerical pushbuttons 56. For one type of meter, depressing the set button causes the print wheels in a print drum within the meter to be set to the desired postage.

A $ unlock key 90 must be depressed by a user in order to set postage equal to, or in excess of, one dollar. This extra physical step acts to prevent costly postage printing mistakes.

The postage meter housing 48 includes a hinged security door or plate 92 having a latch 94. This latch secures the door 92 to the housing 48 by means of a wired lead seal 96. Postal authorities are the only ones empowered to open the seal 96. The door 92 protects switches 98 and 100 shown in phantom. Switch 98 enables the computerized system to call into operation a routine which provides for the entering of postage funds into the system. Postage funds may be entered into the system by first keying in the amount of postage to be added through the numerical pushbuttons 56. This amount of postage appears on the display and is added to the descending and control sum registers of the postage meter system by opening security door 92 and pressing button 98. This button initiates a jump in the postage meter program to the above-mentioned routine. After the routine is executed, the door 92 is again secured by a seal 96.

Switch 100 is provided for removing funds from the descending and control sum registers in the event a mistake is adding funds has occurred. The need for adding funds to the system is signaled by an insufficient postage indicator lamp 102.

A Check Date reminder is provided by indicator 104 each time the postage meter system is turned on.

A Meter Enabled Indicator 106 lights when it is established that (a) the meter print drum has been set to the proper postage; (b) the postage to be imprinted appears at the numerical display 82; and (c) sufficient funds are available to imprint the postage desired.

Indicator lamp 108 signals the operator to call a service man. This indicator is energized for certain types of system errors, e.g., when the control sum is not equal to the sum of the ascending and descending registers. When such errors are detected, the meter may be automatically disabled to prevent further use. A service man would, of course, be able to restore the meter to its normal operating mode once the error is corrected.

Indicator 110 signals the operator that the postage to be set is equal to or more than $1.00 and that $ unlock button must be depressed before the set button 66 will function.

An indicator 112 is energized when the contents of the ascending register are displayed in numerical display 82. An indicator 114 is similarly energized when the contents of the descending register appear on numerical display 82.

The batch amount indicator 115 and the batch counter indicator 116 are energized when the contents of the respective registers are being displayed. The piece count indicator 118 is energized when piece count information is displayed. Similarly, a control sum indicator 120 is energized when the control sum is displayed on numerical display 82.

A low postage (<$100) indicator 123 informs an operator that the funds remaining in the descending register are currently below $100. This should alert the operator that he will need to recharge the system with additional postage funds in the near future.

Figure 4:
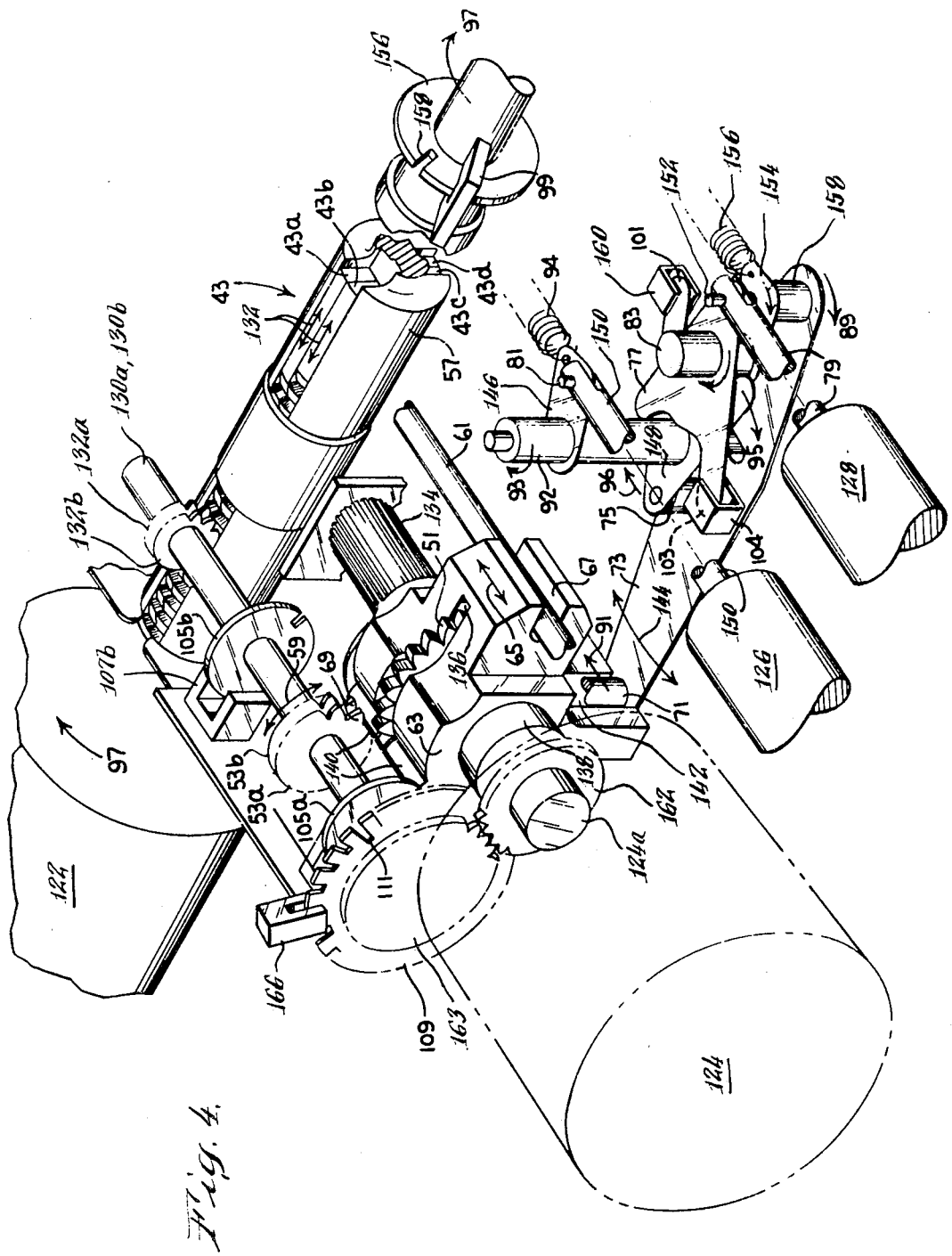
FIG. 4 is a perspective view of a postage printer.

An embodiment of one meter setting mechanism is illustrated in detail in FIG. 4. The meter is a modified Model 5300 postage meter manufactured by the assignee of this invention—Pitney Bowes, Inc., Stamford, Connecticut. The modified meter includes a print drum 122 and print wheel driving rack 43 from the Model 5300 postage meter. Mechanical registers and actuator assemblies have been removed. Print wheels (not shown) within print drum 122 of the modified meter are set by a mechanism driven by a stepping motor 124 and a pair of solenoids 126 and 128. The stepping motor 124 drives an upper and lower set 43 of racks 43a, 43b, 43c, 43d through an upper pair of nested shafts 130a, 130b, and a similar, lower pair of nested shafts (not shown).

The print drum 122 has four print wheels (not shown) which provide a postage impression to a maximum sum of $99.99. Each print wheel provides a separate digit of this sum, and is settable from "0" to "9". Each of the print wheels is set by means of one of the four drive racks 43a, 43b, 43c, 43d. The drive racks slide in the directions indicated by arrows 131 within a drumshaft 57.

The upper racks 43a, 43b are driven by pinion gears 132a, 132b respectively. The lower racks 43c and 43d are controlled by a similar set of pinion gears. The pinion gear 132a is mounted on shaft 130a. The pinion 132b is mounted on shaft line 130b. The pinion gears for the lower racks 43c, 43d are similarly mounted on the lower set of nested shafts. These shafts are rotated in the directions indicated by double-headed arrow 59 by means of spur gears, the upper pair 53a, 53b of which are shown.

A master gear 51 engages each of the spur gears in succession to sequentially set the print wheels for "tens of dollars", "dollars", "tens of cents" and "units cents" in the meter. The master gear 51 can be shifted laterally (in the directions indicated by double-headed arrow 65) into a meshing relationship with each of the spur gears within a yoke 63 which slides on splined shaft 134. The master gear 51 is mounted in a slot 136 in yoke 63 and can be rotated in either direction by the stepping motor 124 through motor shaft 124a and splined shaft 134. A sleeve bushing 138 separates yoke 63 from the splined shaft 134. The yoke 63 and master gear 51 are guided and supported by an additional smooth shaft 61 which nests within a slot 67 of yoke 63 and prevents rotation of the yoke due to any slight friction between the mating surfaces of the yoke and sleeve bushing 138.

To assure alignment of the teeth of the master gear 51 with the teeth of the several spur gears, a pair of upper and lower tooth profiles are formed on the adjacent surfaces of the yoke 63. Only the upper profile 140 is shown. As the yoke 63 slides in the direction indicated by the double-headed arrow 65, one tooth on each of the spur gears is locked into place between the tooth profiles. Each of the gears is free to turn only when the master gear is meshed with it. The tooth profiles also serve the additional function of locking the spur gears in place once the meter is set to prevent anyone from attempting to tamper with the meter by manually altering the print wheel positions from the exterior of the meter.

Lateral movement of the yoke 63 is controlled by a toggle pin 71 seated in a groove 142 of the yoke 63. The toggle pin 71 pushes against the yoke 63 when a pivotable link 73 to which it is attached is made to pivot (arrows 144) about a center shaft 75. Movement of link 73 is controlled by the two solenoids 126 and 128 acting through pivot arms 146, 148 and 77, 154 respectively. The solenoids 126 and 128 pull on their respective pivot arms 146 and 77 through pull rods 150 and 79 which are pinned to the pivot arms by pins 81 and 152 respectively. When the pull rod 79 pulls upon arm 77, the arm pivots about a shaft 83. When this occurs, arm 154 is caused to be pivoted against the biasing action of a spring 156. This, in turn allows a shaft 158 to pull pivot arm 73 forward or in a direction indicated by arrow 89. The forward movement of pivot arm 73 about center shaft 75 causes the toggle pin 71 to move rearwardly or in the direction indicated by arrow 91.

There are four combined solenoid pull positions corresponding to the four separate mating positions between the master gear 51 and the spur gears: neither solenoid energized; both solenoids energized; solenoid 126 only energized and solenoid 128 only energized. Master gear 51 is opposite a different one of the spur gears for each different combination of energized solenoids. When all of the spur gears have been rotated to selected positions of the master gear 51, causing the racks 43 and the print wheels (not shown) to assume postage value positions, the drum 122 is ready to be rotated by shaft 57 in the direction indicated by arrow 97 to actually imprint the postage.

The home position of drum 122 is monitored by a slotted disk 156 mounted on shaft 57. When a slot 158 on disk 156 moves into an optical detector 99, the print cycle is completed.

All optical detectors in the setting mechanism comprise a light emitting diode (LED) and a phototransistor for receiving light emitted by the LED. The lateral position of master gear 51 in yoke 63 is monitored indirectly by monitoring the pivot positions of pivot arms 146 and 77 respectively. Pivot arm 148 has a finger 101 which pivots into and out of a detector 160 when the solenoid 128 is energized and de-energized.

The home positions of shafts 130a and 130b are monitored by slotted disks 105a, 105b, respectively. When a slot in disk 105a is within an associated optical detector, shaft 130a is at zero. Similarly, when a slot in disk 105b is in well 107b, shaft 52b is at zero. The lower pair of nested shafts are monitored through similar apparatus (not shown).

Rotation of the stepping motor shaft 124A, is monitored through gears 162 and 163, slotted monitoring wheel 109 and monitoring well 166. When stepping motor shaft 124a rotates splined shaft 134 and master gear 51, gear 162 rotates through the same angular increment. Gear 162 intermeshes with gear 163 which is attached to the slotted monitoring wheel 109. This train of gears causes wheel 109 to turn through the same angles as shaft 124a. Every fifth slot 111 on the monitoring wheel 109 is extra long to provide a check on the setting mechanism. Each slot in wheel 109 corresponds to a change of one unit of postage value. The slotted wheel 109 is optically monitored by detector 166. Detector 166 has two photosensors. The first photosensor is located near the periphery of slotted wheel 109 and senses every step of the stepping motor 124. The other photosensor is located near the center of the slotted wheel 109 and senses every fifth step. By counting the number of single step movements and determining whether a count of five exists when slot 111 is aligned with detector 116, it can be determined whether all single step movements have been properly sensed.

Figure 5:
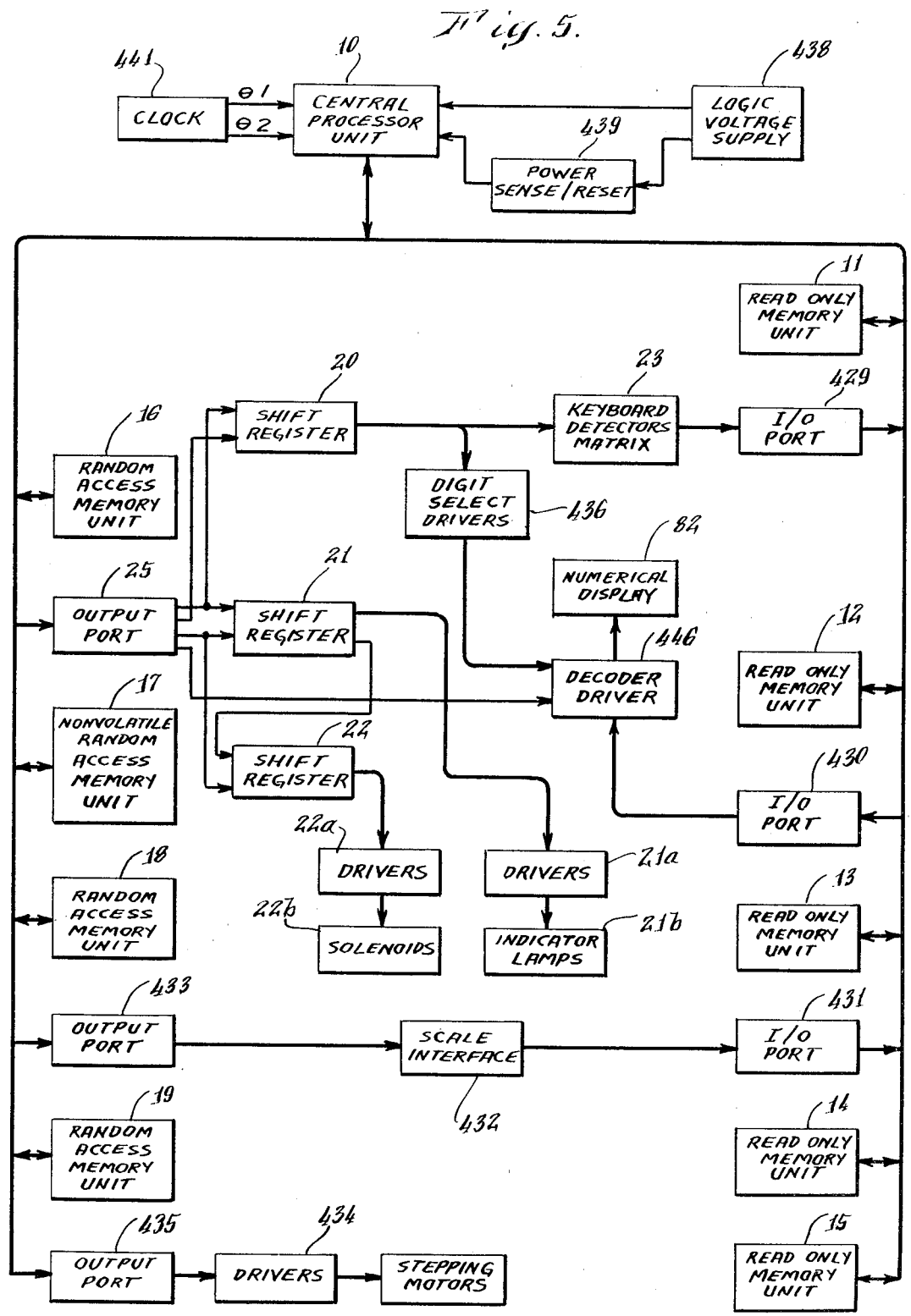
FIG. 5 is a block diagram of components of the postage meter system shown in functional form in FIG. 1.

Referring now to FIG. 5, a block diagram of a suitable computer control is shown. The system is made up of components generally included in a MCS-4 microcomputer component set which is a product of Intel Corporation, Santa Clara, California. This set of components includes a central processor unit (CPU) 10 which is connected to a number of read only memory (ROM) units 11, 12, 13, 14 and 15 and to a number of random access memory (RAM) units 16, 17, 18 and 19. Random access memory unit 17 is made to operate as the non-volatile memory unit through the use of the battery backup unit. As discussed earlier, unit 17 is used to store critical accounting data. A number of shift registers (S/R) 20, 21 and 22 are connected into the system through output port 25. In one commercially available device, output port 25 would be physically located on the same chip as random access memory unit 16 but would function independently. Each output port has four binary-value output lines as shown. The read only memories 11, 12 and 13 also are associated with input/output ports (I/O) 429, 430 and 431 respectively, each of which has a four-bit capacity. Although the input/output ports are physically located on the chips, they are logically independent of the read only memories.

The shift registers 20, 21 and 22 provide port expansion for the postage meter system. In addition shift register 20 provides a multiplexing capability digit select drivers 436 of numerical display 82 and for a keyboard and meter setting detector matrix 23. Shift registers 21 and 22 are serially connected to provide an extended length register for controlling driver circuits 21a and 22a for indicator lamps 21b and solenoids 22b, respectively. Solenoids 22b are the meter setting solenoids 126 and 128 described earlier.

The numerical display 82 is controlled by decoder/driver 446 which is connected into the system through shift register 20. One lead of output port 25 provides a blanking control signal to the decoder/driver 446 to eliminate leading zeros in the numerical display 82.

The inputs from the keyboard detectors matrix 23 are fed to the system through input/output 429.

Postage requests and multiplexing select signals are applied to scale interface circuit 432 from output port 433. The scale signals are applied to the system through input/output port 431.

Stepping motors in the meter setting mechanism are controlled by driver circuits 434 connected to the system through output port 435.

A computer system of the particular type described employs logic level voltage power supply 438. A power sense/reset circuit 439 is interconnected into the system to detect power failures. When a power failure or unacceptable low voltage is detected by power sense/reset circuit 439, the system updates the contents of the non-volatile memory 17 as part of a shutdown routine.

A clock 444 serves to correctly phase the operations of the system. Two non-overlapping clock signals $\phi 1$ and $\phi 2$ are supplied to the system by clock 441.

The CPU 10 generates a SYNC signal every eight clock periods as shown in the Users Manual for the MCS-4 microcomputer set, copyright 1972, FIG. 2 on page 6 thereof. The SYNC signal marks the beginning of each instruction cycle. The ROMs and RAMs generate internal timing using SYNC, $\phi 1$ and $\phi 2$. The shift registers are static devices and do not employ these clock pulses in their operation.

Figure 6:
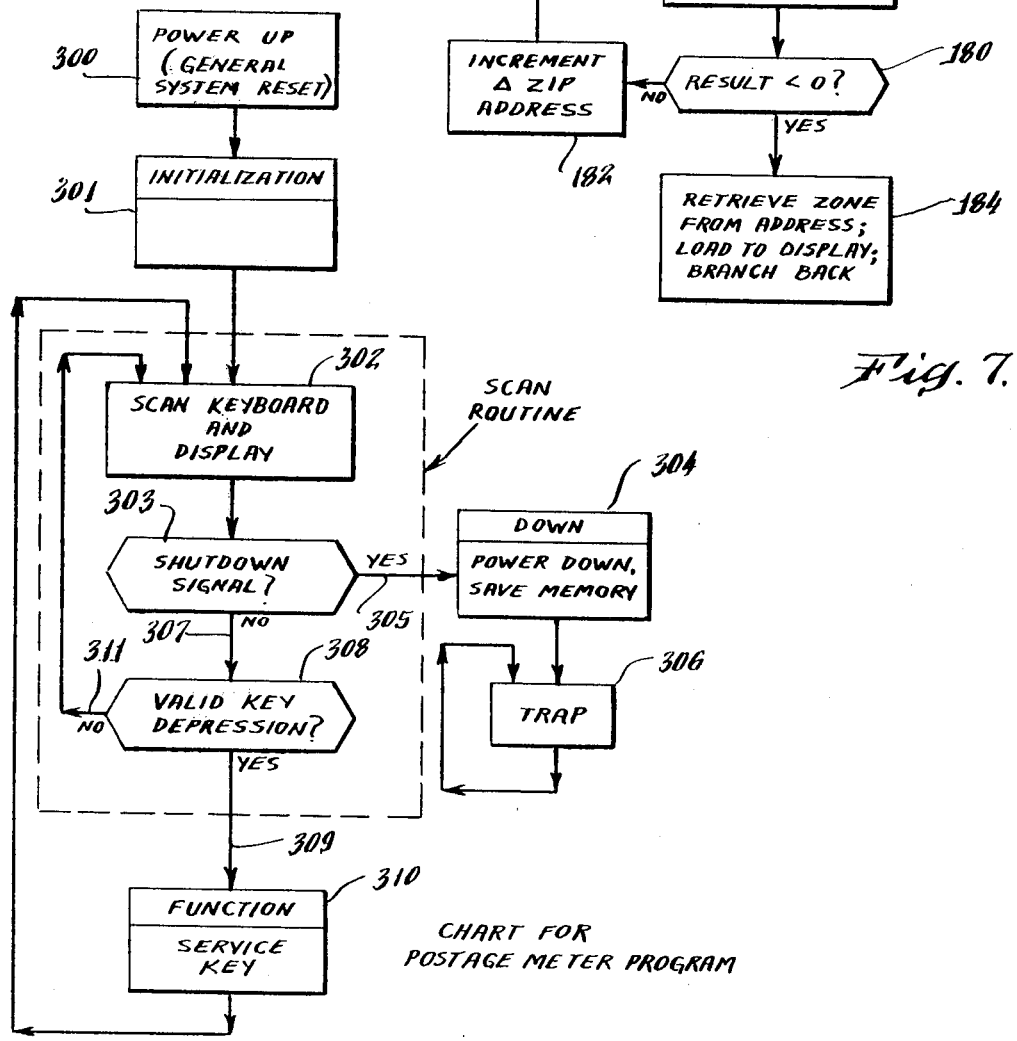
FIG. 6 is a flow chart of the generalized overall operation of the system shown in FIG. 1.

Referring to FIG. 6, the overall operation of the system is represented in simplified flow chart form. When power is first applied to the system as shown in operation 300, a general reset system pulse initializes the total system. This system reset pulse causes the CPU registers, RAM memories and input/output ports to be cleared and initiates execution of a postage meter program. The print wheels of the mechanism shown in FIG. 4 are set to zero if they are not zeroed already.

Once the system has been initialized, a scan routine begins. This routine is shown generally as operations 302, 303 and 308. The scan routine searches for a depressed key on keyboard 38 and multiplexes the numerical display 82. When a validly depressed key is detected at block 308, the scan routine branches to the appropriate subroutine corresponding to the function called for by that particular key. The scan routine retrieves an address of a subroutine called by the key from storage in a "look up table". The stored address is transferred to a register in the CPU 10. A subroutine is then executed to provide a jump to the address stored in the register. After a particular key is serviced as indicated at 310, the scan routine is reentered to look for new imputs from the keyboard 38.

During the course of a scan routine, the power status of the system is periodically checked as indicated at 303. In case of a power failure, the postage meter system must be able to complete any current operations, including the loading of critical accounting data into nonvolatile random access memory unit 17. When the current operations have been completed, the system enters a trap at block 306. The program cannot reenter the scan routine except by the initiation of a complete "power-up" sequence.

The system described with reference to FIGS. 1, 5 and 6 utilizes a number of programs which, together with explanatory appendiums are printed as an Appendix to this specification. The programs include a number of routines and subroutines which are described briefly below.

A SCAN routine, described as part of FIG. 6, multiplexes the display and searches for keyboard inputs. The SCAN routine is entered upon completion of an INITIALIZATION routine which clears the CPU registers, RAM registers, and I/O ports. The SCAN routine periodically calls up a FCTN subroutine when a depressed key is sensed. The PCTN subroutine services the key; i.e., performs the function requested by the key. Periodic checks of the power condition of the system are made and a DOWN subroutine entered if operations must be wound up. The initialization procedure includes a CHCK routine used to detect whether the ascending register plus the descending register minus the control sum equals zero. If not, the CHCK routine energizes "call service" indicator 108 and disables the meter.

A number of subroutines are used to control the operation of the meter setting mechanism. A HOME subroutine is employed to set the four print wheels of the meter to their home or zero position. The photocells used to monitor the home position are read in the course of a ZEROB subroutine called up when the print wheels are being set to zero. A STPB subroutine, which selects the print wheel to be set, is included as part of a meter MAIN routine. Another included subroutine is a STEP routine used to charge the setting of a selected print wheel by one unit. The solenoids which control the lateral position of the yoke for the master gear are under the control of the STPB subroutine.

There are, of course, a number of "housekeeping" subroutines. The CLEAR subroutine is multifunction in that it (1) clears the display, (2) recalls the contents of an addition register into the display, (3) clears the addition register of the second successive clear, and (4) clears both the batch count and batch amount registers if the contents of either are displayed when the subroutine is called. An ADDD subroutine is used to increment or decrement a selected meter register. A PLUS subroutine adds the contents of the display to the addition register and stores the result in both the addition register and the display register. A CLDSP subroutine writes "0's" into the display while a CLEER subroutine writes "0's" into an area specified by a preset index register. A FETCH subroutine initializes an index register to specify the meter register being called into operation.

The programs also include a CMPAR subroutine for comparing the contents of a meter setting register against the contents of the descending register to determine if sufficient funds are available for the proposed printing of postage. An UNLOCK subroutine sets a $ UNLOCK flag to enable the printer if the requested postage exceeds one dollar. The POST subroutine updates meter registers each time postage is printed while an ENBLE subroutine determines whether the printer may be enabled for a subsequent imprint for the same amount.

In the display routine, a LDLMP subroutine transfers data in an indicator register to a shift register which drives the selected lamp display. An OUTPT subroutine is employed to enter a parallel-presented 4 bit word into a display register in serial fashion.

The subroutine employed in adding funds to the meter is identified as the ADP subroutine while SUBP subroutine is employed for subtracting funds from the meter.

As indicated earlier, a user may enter a destination zone for a package to be mailed directly through numerical keys 56 or, in the alternative, may enter a destination zip code prefix through keyboard 56. If the zip code prefix is entered, the user depresses the Zip-Zone key 58 to initiate a zip-to-zone conversion.

The zip-to-zone conversion utilizes a ΔZIP approach. When a meter is installed at a specific location, conversion tables are generated with reference to the Postal Service Official Zone Chart for that location. A small portion of the Official Zone Chart for use by mailers having originating Zip Codes 06801–06999; i.e., the Stamford-Danbury area of Connecticut, is reproduced in Table I below. This information was taken from Zone Chart No. 068–069 issued by the U.S. Post Office in May, 1969.

TABLE I

| Zip Code Prefixes | Zone |
|---|---|
| 006–009 | 7 |
| 010–018 | 2 |
| 019 | 3 |
| 020–025 | 2 |
| 026 | 3 |
| 027–031 | 2 |
| 032–033 | 3 |
| 034 | 2 |
| 035 | 3 |
| 036 | 2 |
| 037–043 | 3 |

To establish the ΔZIP values employed in the conversion process, the zip code prefixes in the Official Zone Chart are isolated into groups of consecutively-numbered zip code prefixes falling within the same zone. Referring to Table II below, the zip code prefixes 006–009 are consecutively numbered prefixes which fall within zone 7. These prefixes comprise the first group of valid codes. Zip code prefixes 000-005 are as yet, unassigned by the Postal Service. For purposes of this invention, these prefixes are grouped together and assigned a Zone "F" to indicate no valid zip code exists. Zip code prefixes 010-018 are also consecutively-numbered but are within zone 2. The change in Zone numbers requires that these prefixes be grouped separately into another group.

The AZIP values represent the difference between the numerical value of the highest zip code prefix in one group and the highest zip code prefix in the preceding group; i.e., the number of consecutive zip code prefixes in a group. By way of example, the highest zip code prefix in group 11 of Table II is 043 while the highest zip code prefix for the preceding group, group 10 is 036. The difference between 043 and 036 provides a AZIP value of seven for group No. 11. AZIP value and associated zone values are stored in memory in the same sequence in which they appear in Table II and the necessary continuation of Table II for the remainder of the Official Zone Chart.

TABLE II

| Zip Code Prefixes | Zone | Group No. | ΔZIP |
|---|---|---|---|
| 000-005 | F | 0 | 6 |
| 006-009 | 7 | 1 | 4 |
| 010-018 | 2 | 2 | 9 |
| 019 | 3 | 3 | 1 |
| 020-025 | 2 | 4 | 6 |
| 026 | 3 | 5 | 1 |
| 027-031 | 2 | 6 | 5 |
| 032-039 | 3 | 7 | 2 |
| 034 | 2 | 8 | 1 |
| 035 | 3 | 9 | 1 |
| 036 | 2 | 10 | 1 |
| 037-043 | 3 | 11 | 7 |

Figure 7:
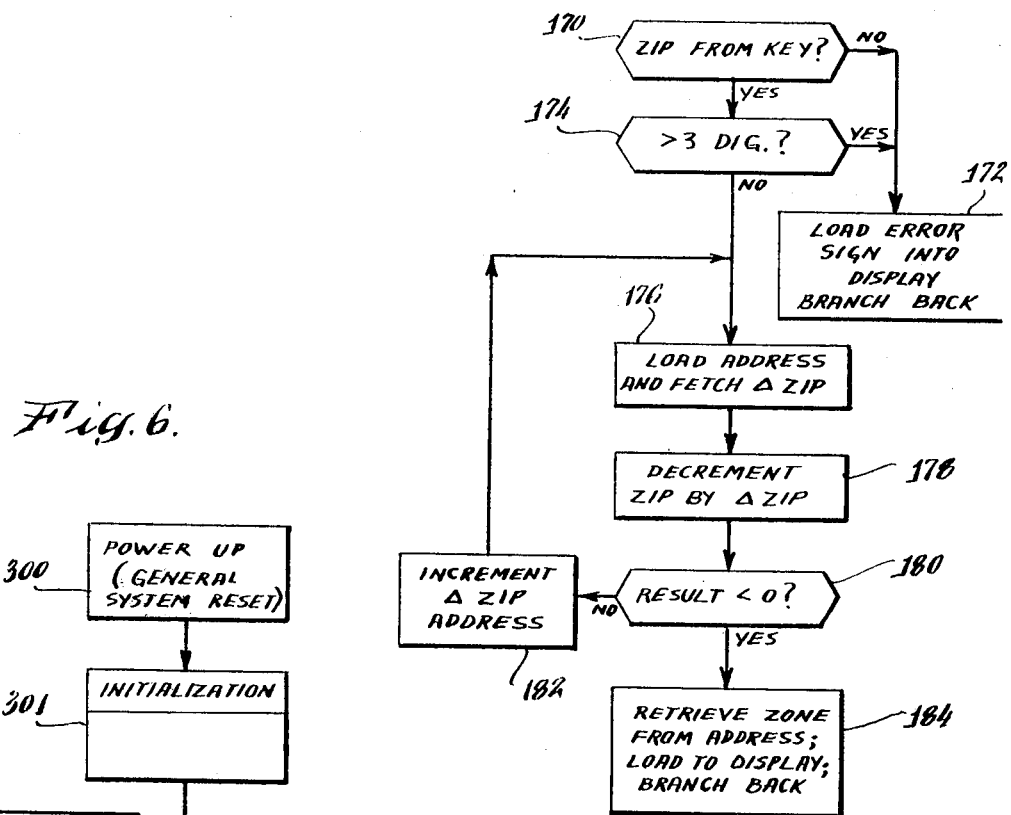
FIG. 7 is a flow chart of the zip-to-zone conversion routine.

Referring to FIGS. 3 and 7, the zip-zone conversion routine is called by depressing Zip-Zone key 58 in keyboard 38. The first step in the routine is to determine whether a valid zip code prefix has been entered from the keyboard. The validity checks consists of determining that the entered prefix has ≦3 digits and was entered through the keyboard. If the entry did not originate at the keyboard, the system is directed to an error routine 172 in which an error sign is loaded into the display. The error routine then returns the system to the normal scan routine. If a keyboard entry is confirmed, a check is made at block 174 as to whether the entered prefix contained more than three digits. If more than three digits were entered, the system enters the error routine 172.

If only three digits were entered into the keyboard, the address of the Group 0 of the AZIP locations is loaded into CPU 10 at operation 176. CPU 10 retrieves the AZIP value; i.e., a value of 6 for Group 1. The entered zip code is decremented by the AZIP quantity in operation 178, and the result checked in operation 180 to determine whether the decremented result is less than zero. If the result is greater than or equal to zero, the Group address is incremented and the processes iterated. The result of operation 178 is iteratively decremented by AZIP values in consecutively numbered groups until operation 180 shows that the result is less than zero. The zone value stored at the address of the last utilized AZIP Group is retrieved and transferred to the display.

TABLE III

| Zip before Op. 178 | Group No. | (ΔZIP) | Zip after Op. 178 | Result <0 | Zone |
|---|---|---|---|---|---|
| 029 | 0. | (6) | 023 | no | |
| 023 | 1. | (4) | 019 | no | |
| 019 | 2. | (9) | 010 | no | |
| 010 | 3. | (1) | 009 | no | |
| 009 | 4. | (6) | 003 | no | |
| 003 | 5. | (1) | 002 | no | |
| 002 | 6. | (6) | −003 | yes | 2 |

TABLE III is a tabular summary of a zip-to-zone conversion which occurs when a 029 zip code prefix, selected arbitrarily, is entered into the keyboard. This zip code prefix is decremented in operation 178 by the AZIP values associated with consecutively-numbered groups. For Groups 0-5, the result of operation 178 is greater than zero. When the AZIP stored at the Group 6 address is used to further decrement the zip value resulting from the previous iteration, however, the result is a negative value. The system responds to this negative value by retrieving the zone value stored at the Group 6 address.

The zip-to-zone conversion subroutine is used in conjunction with a postage calculation routine shown in flow chart form in FIG. 8. The routine automatically calculates the postage required to mail a package at surface parcel post rates. The routine requires that a user enter either the destination zip code or the destination zone and utilizes weight-representing signals generated by scale 54.

The first operation 315 in the routine is to initialize the registers used for working storage. The scale input is read in operation 316. In one embodiment of the invention, the scale input is read in one pound increments. Package weights falling between pound increments are read as the next higher pound increment. For example, the scale reading for a 5.4 lb. package would be 6 lbs.

A series of error checks are made following the reading of the scale input. A weight check 317 determines whether the scale reads 0, indicating an error such as a disconnected or malfunctioning scale. Subsequently, a weight check 318 is made to determine whether the scale reading exceeds 70 lbs. A scale reading in excess of 70 lbs. may indicate a scale malfunction where the scale upper measuring limit is 70 lbs. In any event, a scale reading in excess of 70 lbs. indicates that the package cannot be mailed at parcel post rates under current postal service regulations. Finally, a check 319 is made as to whether the zone value is less than or equal to 8. Since there are only 8 zones in use according to current postal regulations, a zone reading of 9 or above must be an error.

If the weight signal and the zone signal are valid, the "cents" and "tens of cents" digits of a base postage for the selected zone are retrieved from storage in operation 320. A further check 321 is made as to whether the zone signal is less than or equal to 3. If the selected zone is in the 4-8 range, the base postage is equal to $1 plus the retrieved digits. If the selected zone is in the Local-3 range, the base postage is equal to the retrieved digits only. This arrangement conserves data storage space in a preferred embodiment of the invention since the 8 bit registers which are used can store 2 digits in binary-coded decimal format. The use of extra registers for storing the dollar digits is avoided by the described arrangement.

The surface parcel post rates for each of the eight different zones increases from the base postage for the zone either by uniform incremental amounts or by different alternating incremental amounts. For example, in zone 1-2, seven cents is added to the postage for each additional pound in weight above 2 lbs. while in zone 3, the postage increases either by 8 cents or by 9 cents for each additional pound over 2 lbs.

Table IV below shows the pattern of increments for each of the eight different zones, zone 1-2, being considered a single zone. The patterns continue throughout the entire weight range. The Table defines the current base postage for each of the zones, an increment A for each of the zones and an alternating increment B for each of the zones.

TABLE IV

| Weight | Local | Zone | | | | | | | |
|---|---|---|---|---|---|---|---|---|---|
| | | 1-2 | 3 | 4 | 5 | 6 | 7 | 8 | |
| 1-2 | 0.77 | 0.90 | 0.93 | 1.04 | 1.15 | 1.28 | 1.40 | 1.48 | Base Postage |
| 2+→3 | .05 | .07 | .09 | .11 | .14 | .18 | .22 | .26 | Increment A |
| 3+→4 | .04 | .07 | .08 | .10 | .13 | .17 | .22 | .26 | Increment B |
| 4+→5 | .05 | .07 | .09 | .11 | .14 | .18 | .22 | .26 | Increment A |
| 5+→6 | .04 | .07 | .08 | .10 | .13 | .17 | .22 | .26 | Increment B |
| 6+→7 | .05 | .07 | .09 | .11 | .14 | .18 | .22 | .26 | Increment A |
| : | : | : | : | : | : | : | : | : | : |
| 68+→69 | .05 | .07 | .09 | .11 | .14 | .18 | .22 | .26 | Increment A |
| 69+→70 | .04 | .07 | .08 | .10 | .13 | .17 | .22 | .26 | Increment B |

When the base postage, increment A and increment B for the selected zone have been retrieved, a weight which is other than an exact pound is adjusted downwardly to the next lower unit pound in operation 322. The postal service regulations provide that a minimum or base surface parcel post rate applied to any parcel weighing 1-2 lbs. As will be made clearer later, adjusting the weight-representing signal downwardly to the next lower unit pound assures that the proper number of incrementing operations are performed during a calculation. After the weight is adjusted, a weight check 323 is made to determine whether the weight-representing signal equals 0. An affirmative answer at this point indicates the package weighs exactly 1 lb. The retrieved base postage would be loaded into the display and control of the meter would be returned to a main program.

If the weight check 323 indicates the weight is not equal to 0, the weight-representing signal is decremented by a pound and another weight check 324 performed. If the second weight check shows the once-decremented signal is equal to 0, indicating the package weighed between 1 and 2 lbs., the base postage amount is loaded into the display and control returned to the main program. If the second weight check indicates the decremented weight signal is not equal to 0, the postage is incremented in operation 325 by the amount of increment A for the particular zone and the weight-representing signal is again decremented. A third weight check 326 is then performed. An affirmative answer to the weight check 326 causes the incremented postal amount to be loaded into the display. A negative answer calls for the postage amount to be incremented by the amount of increment B for the zone. When increment has been added to the postage, the weight-representing signal is again decremented and a fourth weight check 327 is performed. If the fourth weight check indicates the decremented weight is not equal to 0, the routine loops back to incrementing operation 325.

The increment postage/decrement weight process is reiterated until one of the weight checks 326 or 327 indicates the weight-representing signal has been decremented to 0. When this occurs, the incremented postage is loaded into the display and control returned to a main program. An example of the calculation performed is set out in Table V wherein it is assumed that a package weighing 5.5 lbs. is to be mailed to zone 6 at surface parcel post rates.

TABLE V

| OPER. # | ACTION TAKEN | DECISIONS | WEIGHT | ACCUM. POSTAGE |
|---|---|---|---|---|
| 316 | Read Scale | | 5.5 | |
| 317 | Weight = 0? | No | | |
| 318 | Weight >70? | No | | |
| 320 | Retrieve Base Digits | | | .28 |
| 321 | Zone ≦3? | No | | |
| | Set $ to 1 | | | 1.28 |
| | Retrieve Increment "A" (.18) | | | |
| | Retrieve Increment "B" (.17) | | | |
| 322 | Adjust Weight | | 5 | |
| 323 | Weight = 0? | No | | |
| | Decrement Weight (−1) | | 4 | |
| 324 | Weight = 0? | No | | |
| 325 | Inc. Postage by "A" | | | 1.46 |
| | Decrement Weight (−1) | | 3 | |
| 326 | Weight = 0? | No | | |
| | Inc. Postage by "B" | | | 1.63 |
| | Decrement Weight (−1) | | 2 | |
| 327 | Weight = 0? | | | |
| 325 | Inc. Postage by "A" | | | 1.81 |
| | Decrement Weight | | 1 | |
| 326 | Weight = 0? | No | | |
| | Inc. Postage by "B" | | | 1.98 |
| | Decrement Weight | | 0 | |
| 327 | Weight = 0? | Yes | | |

TABLE V-continued

| OPER-# | ACTION TAKEN | DECISIONS | WEIGHT | ACCUM. POSTAGE |
|---|---|---|---|---|
| | Load Accumulated Postage Into Display | | | |

It would be possible to perform the postage calculations using a postage lookup table storing the proper or postage for each package weight in the 1–70 lb. weight range for each of the zones. The arrangement just described clearly requires much less memory capability.

Figure 9:
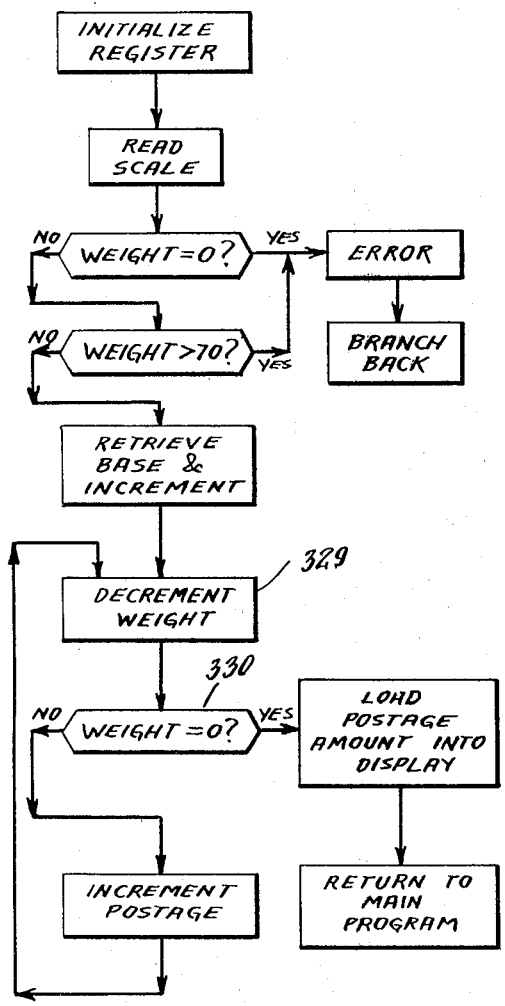
FIG. 9 is a flow chart for a routine for calculating library rates postage.

The same decrement weight/increment postage concept is used to calculate postage for parcels being mailed at library rates. FIG. 9 is the flow chart for the calculation of library rate postage. The first four steps for the library rate routine are identical to the corresponding steps of the parcel post rate routine. That is, registers are initialized, the scale input is read and weight checks are performed to determine whether the scale reading is either equal to 0 or greater than 70. If the scale input is greater than 0 and less than or equal to 70, the base postage and postage increment for the library rate class of handling are retrieved in operation 328. Currently, the library rates are 3 cents for the first pound of a parcel plus 4 cents for each additional pound. Thus, the base postage would be 8 cents and the increment 4 cents. The weight-representing signal is decremented byu 1 lb. in operation 329 and a weight check 330 performed to determine whether the weight equals 0. If the decremented weight-representing signal equals 0, the postage is loaded into the display and control of the meter return to the main program. If the signal is not equal to zero, the postage is incremented and the routine is re-entered at operation 329. The process is iteratively performed until the weight check 330 reveals the weight-representing signal has been decremented to 0.

The routine for calculating book rate postage amounts uses the same decrement weight/increment postage concept as the routines just described. The details of the book rate calculation routine differ because of the difference in current postal service rate structures.

Postal service regulations establish current book rate postage at 21 cents for the first pount of a parcel plus 9 cents for each additional pound up to 7 lbs. The postage increase by 8 cents for each pound above 7 lbs.

Figure 10:
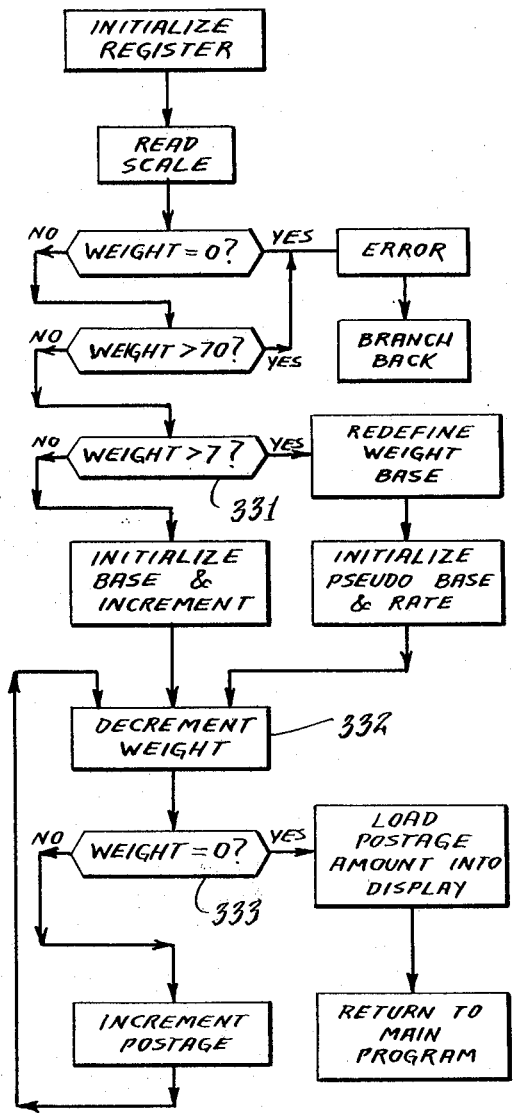
FIG. 10 is a flow chart of a routine for calculating book rates postage.

Referring to FIG. 10 for a flow chart of the routine for calculating book rate postage, the first four steps of the routine are the same as the corresponding steps for the parcel post calculation routine and the library rate calculation routine. That is, registers are initialized, the scale input is read, and weight checks are performed to determine whether the weight/representing signal either equals 0 or is greater than 70. Assuming the weight checks are satisfied, a further weight check 331 is made to determine whether the weight of the parcel is more than 7 lbs. If the parcel weighs 7 lbs. or less the base amount of 21 cents and an incremental amount of 9 cents per lb. (at current rates) is retrieved. The weight-representing signal is decremented by 1 lb. in operation 332 and another weight check 333 performed to determine whether the decremented signal equal 0. If not, the base amount is incremented and the routine re-entered at operation 332. The process iterations continue until the weight check 333 indicates the weight-representing signal does equal 0.

If the weight check 331 indicates the package weighs more than 7 lbs., the scale input signal is redefined in operation 334 by decrementing it by 7 lbs. a psuedobase and rate is established in operation 335. The psuedo base amount is actually the amount of postage required for a 7 lb. package while the incremental rate is the 8 cent increment required for parcels weighing more than 7 lbs. Thus, according to this subroutine, a 10 lb. parcel would be redefined as a 3 lb. parcel having a base postage of 75 cents. The decrement weight/increment postage iterative routine would decrement the 3 lb. signal while incrementing the 75 cent base postage by 8 cents for each of the remaining 3 lbs.

When the proper value has been calculated and any special charges added by the user through numerical keyboard 56, depressing the set button and the unlock button, if necessary, causes the system to initiate setting of the meter. In very general terms, the master gear 51 is shifted a print wheel bank at a time by selective energization of solenoids 126 and 128. The rotation of master gear 51 in each of the print wheel bank positions is controlled as a function of the set postage. Motor control signals are provided through output port 435.

Figure 11:
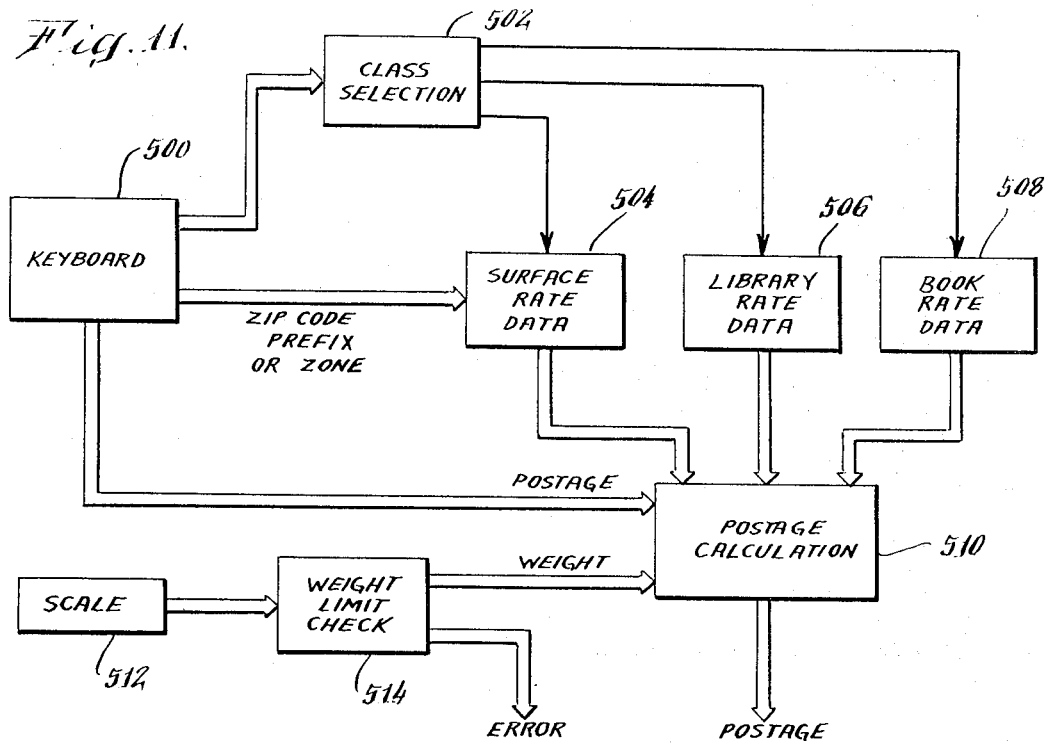
FIG. 11 is a functional block diagram of a random logic implementation of the invention.

While a postal calculator embodying the present invention has been described in the context of a special purpose computer system, such a calculator can be implemented in the form of discrete or hard-wired logic circuits. FIG. 11 is a block diagram of such an implementation and includes a keyboard 500 for entering postage directly, for entering destination zip code prefixes or destination zones and for selecting the mailing class to be utilized. A class selection lockout circuit 502 accepts the keyboard input and provides an energizing output to one of three circuits; a surface rate data circuit 504, a library rate data circuit 506 and a book rate data circuit 508. Class selection lockout circuit 502 simultaneously inhibits inputs representing the other two classes of handling. A destination zip code prefix entered through keyboard 500 is applied directly to surface rate data circuit 504 which determines the proper zone value and accesses data storage elements containing the minimum postage and the postage increments for that zone. The minimum postage and postage increments for the selected class of handling and zone (for surface rate class) are inputted to a postage calculation circuit 510 which also accepts a weight-representing signal generated in the scale mechanism 512, provided the input weight falls within the proper limits as determined by an interposed weight limit check circuit 154. If the weight is outside the appropriate limits, an error signal is generated.

Figure 12:
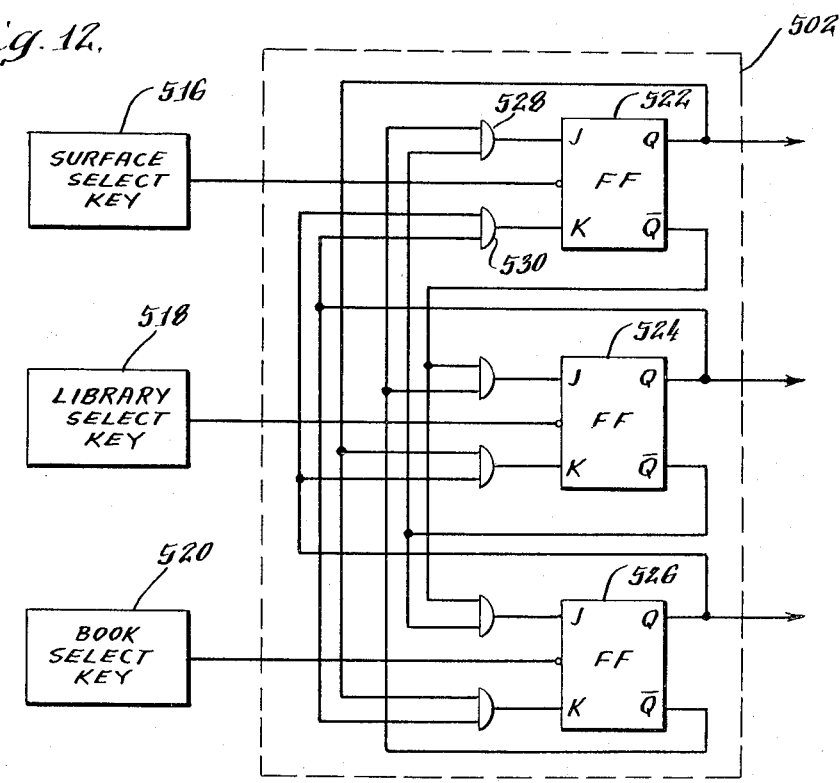
FIG. 12 is a class-of-handling selection and lockout circuit for the system shown in FIG. 10.

The class selection lockout circuit is shown in FIG. 12. The lockout circuit includes inputs from the surface rate select key 516, a library rate select key 518, and a book rate select key 520, each of which generates a positive going pulse when depressed. The outputs of the keys 516, 518 and 520 are applied to trigger inputs of conventional J-K flip flops 522, 524, 526, respectively. The J input terminal for each flip flop is provided by a dual-input AND gate having its inputs connected to the Q output of the other two flip flops. The K input terminal for each flip flop is also provided from the dual-input AND gate having its inputs provided by the Q output terminals of the other two flip flops. As an example, AND gate 528 connected to the J input terminal of flip flop 522 has its first input from the $\bar{Q}$ output terminal of flip flop 524 and its second input from the $\bar{Q}$ output terminal of flip flop 526. An AND gate 530 connected to the K input terminal of flip flop 522 has one input from the Q output terminal of flip flop 524 and another input from the Q output terminal of flip flop 526.

When the system is initialized prior to use, each of the flip flops 522, 524, 526 is driven to a reset state by a clear pulse applied to a clear input terminal (not shown). In the reset state, the $\bar{Q}$ output for each flip flop is at a binary 1 level while the Q output is at a binary zero level. In this initialized condition, the J input terminal for each flip flop carries a binary 1 signal and the K input terminal carries a binary 0 signal. When one of the keys 516, 518, 520 is depressed, the flip flop connected to that key is driven to a set state wherein its Q output rises to a binary 1 while its $\bar{Q}$ output falls to a binary zero.

For purposes of illustration, assume key 516 has been depressed to select the surface rates class. At the trailing edge of a pulse generated by depression of the key, flip flop 522 is driven to the set state. A binary zero signal on the $\bar{Q}$ output terminal is applied to the AND gates at the J input terminals of the other two flip flops 524 and 526. The AND gates provide binary zero signals to the J and K input terminals of the flip flops 524 and 526 to inhibit any change in state of those flip flops if ether the library rate select key 518 or the book rate select key 520 is subsequently depressed. A binary 1 signal on the Q output terminal of flip flop 522 initializes and energizes a zip to zone conversion circuit shown in block diagram form in FIG. 13.

The zip to zone conversion circuit includes the keyboard 500. In one embodiment of the invention, a five bit word representing a 0-9 number is entered in parallel into the system. Four of the bits identify the numeral. The fifth bit, a fixed binary one, is used for signal shifting and error checking purposes.

When any numerical key on keyboard 500 is depressed, a five bit word is applied in parallel to an OR gate 532 and to a delay circuit 534. The OR gate 532 always responds to an entry regardless of the numerical value since each word contains at least one binary 1 in the fifth or control position. OR gate 532 transmits a pulse to a pulse generator 536. Pulse generator circuit 536 provides a shaped pulse suitable for controlling the shifting of parallel data through serially connected shift registers 538, 540, 542, 544. A delay circuit 534 transfers each 5 bit word into the first of these registers 538 shortly after the shift pulse occurs. Upon entry of subsequent words, the pulse generated by pulse generator 536 causes the words to be propagated through successive registers.

A validly-entered zip code prefix includes only three numerical digits. Therefore, if register 544 contains any fourth numerical digit, including a zero, at least one binary 1 signal will be stored in register 544 since the fifth bit of each word is alway a binary 1. A binary 1 output from OR gate 546 is construed as an error signal.

To determine whether at least three digits have been entered into the system, the control bit position in each of the shift registers 538, 540, 542 is connected to one input of a quad input AND gate 548. The fourth input to AND gate 548 is provided by a zip-zone conversion key on keyboard 500. If the necessary three digits have been entered into the registers when the zip-zone conversion key is depressed, all inputs to AND gate 548 will be at binary 1 levels, producing a binary 1 signal on the output of that AND gate. The output of AND gate 548 is the control input for a high impedance logic buffer circuit 550 such as a DM 7094/DM6094 TRI-STATE quad buffer available from National Semiconductor Corporation. With a binary 1 on its control input, buffer circuit 550 transmits the contents of the registers 538, 540, 542 to an unassigned zip code detector circuit 552 and to the inputs of a second logic buffer circuit 558. Since the fifth bit of each input word is no longer needed and since the buffer circuits 550 and 558 are made up of parallel-connected quad input devices the necessary number of devices/buffer circuit is held at three by only using the four numeral-identifying inputs of each word. Unassigned zip code detector 552 may comprise a BCD to decimal converter for applying decimal representations of the digits of the zip code prefix to a number of AND gates each having normal and inverted inputs which allow the AND gate output to rise to a binary 1 level when a signal pattern for an unassigned zip code is detected at its inputs. If the output of any AND gate in the unassigned zip code detector 552 goes to a binary 1 level, indicating the entered zip code is not in use, an error signal is generated.

Assuming the zip code prefix is a valid one, the output of the unassigned zip code detector circuit 552 remains at a binary 0 level. This binary zero signal is inverted by an inverter 556 to provide a signal-passing binary 1 control input to the second logic buffer circuit 558. Logic buffer 558 transmits the information to an OR gate 560 and to an input register 554. The OR gate 560 initiates operation of a counter/decoder circuit 562 which provides sequential decimal-coded outputs to ΔZIP registers 564 containing ΔZIP values isolated into groups, defined earlier. The ΔZIP values are transferred Sequentially into an arithmetic unit 566 which has the second input from the input register 554. The function of arithmetic unit 566 is to decrement the contents of register 554 by the AZIP value currently applied to the arithmetic unit 566. This decremented signal is applied to an output register 568 from which it is fed back to the input register 554 for use in the next iteration. The output register 568 also provides an input to a result check circuit 570 which operates to determine when the contents of register 568 have become less than or equal to zero.

If the result check shows that the decremented signal in register 568 has become less than or equal to zero, a binary 1 signal is applied to one input of each of a number of dual input AND gates in an array 572. A second input to each AND gate is energized by the output of counter/decoder 562 only at a particular decimal count. When an AND gate in the array 572 is energized, that AND gate causes the contents of an associated zone value register to be shifted out for further use in the postal calculations. The same count from counter/decoder circuit 562 which transfers the final AZIP value into the arithmetic unit 566 is used to establish access to the zone register. Therefore, the last AZIP value retrieved and the zone value might be considered to have the same storage address notwithstanding they are stored in separate registers.

The zip to zone conversion process described above involves decrementing of a zip code related signal. It is possible, as an alternative mode of computation, to provide the same zip to zone conversion through the use of an incrementing process wherein iteratively accumulated AZIP values are checked against the originally entered zip code prefix. Referring to FIG. 14, the destination zip code prefix transmitted by logic buffer circuit 558 is stored in a register 574 providing one input to a digital comparator circuit 576. AZIP values retrieved from the AZIP registers 564 are totalled in an accumulator circuit 578 providing a second input to the digital comparator circuit 576. The digital comparator circuit 576 continually compares the contents of prefix register 574 and accumulator circuit 578 until it is determined that the contents of circuit 578 are equal to or greater than the contents of register 574. Comparator circuit 576 provides the control input to AND gate array 572, which accesses the contents of the zone registers 573.

Referring to FIG. 15, the postage calculator circuitry has inputs from a scale mechanism 582, from the zip to zone conversion circuit as represented by surface rates select block 584, from a library rates select block 586 and from a book rates select block 588. The outputs of blocks 586 and 588 are the outputs of flip flops 524 and 526, respectively, in the class selection lockout circuit 502 of FIG. 11. The output of scale mechanism 582 is applied to weight checking logic gates 590, 592, 594, 596 and 598. To simplify the drawings, the decimal value for the binary inputs to each of thes gates is shown. NOR gate 590 produces a binary 1 signal if and only if the weight of the package is less than 1 lb. AND gate 594 produces a binary 1 output if and only if the weight of the package is greater than 70 lbs; specifically, 72, 80 or 96 lbs. AND gate 598 produces a binary 1 output signal if and only if the weight of the package is 70+ lbs. OR gate 600 provides an error signal if either of the AND gates 594, 598 is enabled. This error signal indicates that the package weight is greater than 70 lbs.

Assuming the weight checks indicate the package weight is within the range of 1 to 70 lbs., the 6 bit binary-coded weight-representing signal is employed in addressing programmable read only memories 614, 616 and 618. Programmable read only memory 614 is also addressed by the 3 bit binary coded zone signal. The binary signals representing a particular weight and a particular zone are used as address signals to select a unique memory location within programmable read only memory 614 for each zone-weight combination. The postage amount corresponding to the zone-weight combination is stored in that location. Using 16 bit words allows postage values ranging from $00.00 to $99.99 to be stored in each location in binary-coded decimal format. The postage value stored in a location addressed by the weight-zone signal is retrieved, provided the surface rate select block 584 has enabled programmable read only memory 614. A retrieved value is outputted to as output register 620.

The same 6 bit weight-representing signal is applied to programmable read only memories 616 and 618 which are enabled when library rates and book rates, respectively, have been selected. In each of these memories, the weight signal is used to retrieve a postage amount from a location uniquely related to the weight.

While there have been described what are considered to be preferred embodiments of the invention, variations and modifications therein will occur to those skilled in the art once they become familiar with the invention. Therefore, it is intended that the appended claims shall be construed to include all such variations and modifications as fall within the true spirit and scope of the invention.

What is claimed is:

1. A method for converting a postal zip code to a postal zone, of a given destination, comprising the steps of;
   (a) storing a sequence of delta zip numbers, wherein a delta zip number is an absolute number corresponding to the number of postal zip numbers in a sequential group corresponding to a common destination zone;
   (b) storing a sequence of postal zones corresponding to the sequence of storage delta zip numbers;
   (c) sequentially decrementing said postal zip number to be converted by absolute numbers in accordance with said stored sequence of delta zip numbers, until a determined numerical value occurs; and
   (d) then retrieving the corresponding zone in said sequence of postal zones.

2. The method of claim 1 wherein said step of sequentially decrementing comprises decrementing said postal zip number until a negative value is attained.

3. A method for converting a postal zip code to a postal zone of given destination, comprising the steps of storing a first sequence of numbers corresponding, in order, to the absolute numbers of zip code numbers in groups of adjacent ascending sequential postal zip code numbers which correspond to a common postal zone number, storing a second sequence of the numbers of said postal zones in the order that they correspond to said groups of zip code numbers, selecting a zip code number, decrementing said zip code number by said absolute numbers in said order until a given result is attained, and retrieving the postal zone number of said second sequence corresponding to the absolute number of times said selected zip code number has been so decremented.

4. The method of claim 3 wherein said of decrementing comprises decrementing said zip code number until a negative value is attained.

5. A method for preparing a parcel for mailing comprising storing a first sequence of numbers corresponding, in order, to the absolute numbers of zip code numbers in groups of adjacent ascending sequential postal zip code numbers which correspond to a common postal zone number at a given location, storing a second sequence of the numbers of said postal zones in the order that they correspond to said groups of zip code numbers, selecting the zip code number of the destination of said parcel, decrementing said zip code number by said absolute numbers in said order until a given result is attained, retrieving the zone number of said second sequence corresponding to the absolute number of times said selected zip code number has been so decremented, determining the postage for mailing said parcel to said destination on the basis of said retrieved postal zone number, and affixing said determined postage to said parcel.

6. The method of claim 5, wherein said step of decrementing comprises decrementing said zip code number by said absolute numbers until a negative value is attained.

* * * * *